July 15, 1958     J. W. DUGAN     2,843,067
APPARATUS FOR MIXING AMMONIA WITH WATER AND FOR
INTRODUCING THE MIXTURE INTO THE SOIL
Original Filed Oct. 31, 1952
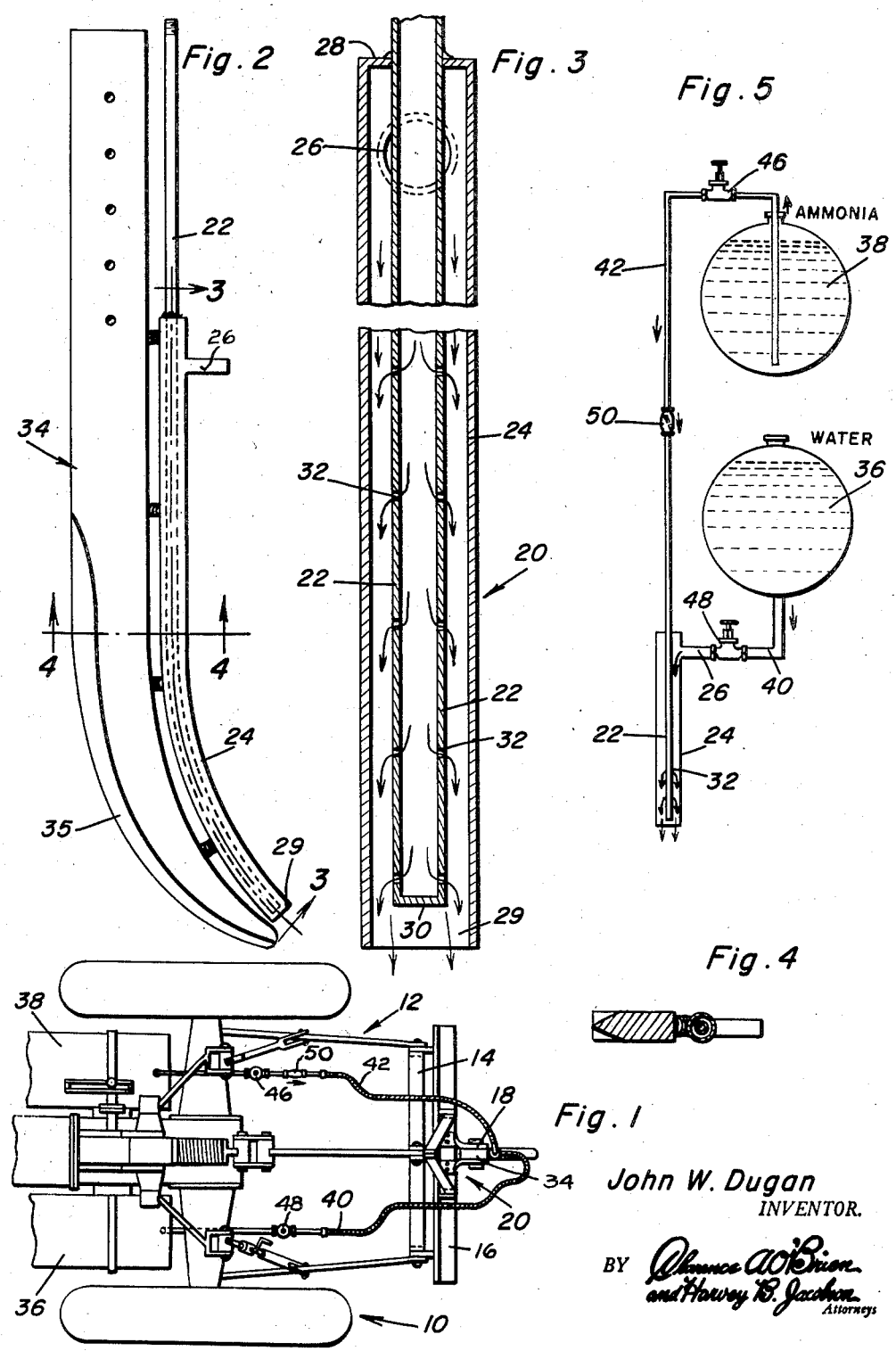
John W. Dugan
INVENTOR.

United States Patent Office 2,843,067
Patented July 15, 1958

2,843,067
APPARATUS FOR MIXING AMMONIA WITH WATER AND FOR INTRODUCING THE MIXTURE INTO THE SOIL

John W. Dugan, Houma, La., assignor to Flo-Mix Fertilizers Corporation, Houma, La., a corporation of Delaware Original application October 31, 1952, Serial No. 318,063, now Patent No. 2,784,530, dated March 12, 1957. Divided and this application November 14, 1956, Serial No. 622,140

4 Claims. (Cl. 111—7)

This invention relates to a device for supplying the soil with nitrogen suitable for carrying into effect the method described in my copending earlier application Serial No. 318,063, now Patent No. 2,784,530, issued March 12, 1957, from which the subject matter of this application is a division.

As has been explained in the said earlier application, two methods of nitrogen fertilization are in general use. One method consists of treating the soil with aqua ammonia and the other method consists in treating the soil with fluid anhydrous ammonia.

As both these methods have certain disadvantages the said earlier application described a method of supplying fixed nitrogen to the soil wherein the quantity of fixed nitrogen available from ammonia application may be varied within wide limits while at the same time the danger of the burning of the sod is eliminated. As a result of this method the economy and efficiency of supplying fixed nitrogen to the soil by the use of anhydrous ammonia is greatly improved.

It is the object of the invention to provide an apparatus by means of which the method described in my earlier Patent No. 2,784,530, issued on my copending application Serial No. 318,063 may be carried out with high efficiency.

It is an object of the invention to provide an apparatus which is attachable to a cultivator and which permits the injection, during the operation of the cultivator, of either anhydrous ammonia or ammonia and water in any desired concentration which concentration may be higher or lower than the standard concentration of ammonia solutions.

It is a further object of the invention to provide an apparatus attachable to the cultivator or knife which is adapted for shallow and for deep soil operations, which apparatus permits to supply, for each of said operations, just as much ammonia as the soil can absorb without any damage to the plants.

It is a further object of the invention to provide an apparatus of the type above described by means of which, according to prevailing conditions, aqua ammonia or anhydrous ammonia may be dispensed in such a manner that no ammonia vapors escape which vapors are not only likely to cause a loss of nitrogen but which damage the sod whenever developing.

Further objects of the invention which are of a more specific character will be apparent from the following detailed specification.

The invention is illustrated by way of example in the accompanying drawings showing one embodiment thereof. It is however to be understood that the embodiment shown does not represent all the various ways by means of which the invention can be carried into effect and that the example illustrated has been selected in order to be able to explain the principle of the invention and the best mode of applying said principle. Other modes of applying the principle will readily occur to the expert skilled in this art and a departure from the example illustrated is therefore not necessarily a departure from the principle of the invention.

In the drawing:

Figure 1 is an elevational top view of a tractor or cultivator frame to which the apparatus is attached.

Figure 2 is a fragmentary enlarged side elevational view of a cultivator blade provided with an applicator.

Figure 3 is a fragmentary enlarged elevational side view in section.

Figure 4 is a cross-sectional top view of a detail taken substantially along line 4—4 of Figure 2.

Figure 5 is a flow diagram of the entire apparatus and of the connections to the fluid reservoirs.

In Figure 1 is shown the rear end of a tractor 10 having a suitable lift assembly 12 to which is attached a drawbar 14.

Detachably secured to a drawbar bracket 16 by any suitable means 18 is the cultivator blade 34 which carries the ammonia applicator 20. The latter as seen in Figures 2 and 3 consists of an inner tube or pipe 22 and an outer tube or pipe 24 concentrically surrounding the lower portion of the inner tube.

The outer tube 24 is provided with an inlet 26 adjacent the upper end thereof and an inwardly extending top plate or cap member 28 which is welded to the wall of the inner tube 22. Thus, in effect, the outer tube 24 serves as a shield or sheath for the lower portion of the inner tube 22. The bottom of the outer tube 24 is open and constitutes a discharge orifice 29 for the apparatus.

The lower portion of the inner tube 22 terminates within the outer tube 24 adjacent the discharge orifice 29 and has a closed bottom 30. The wall of the inner tube 22 disposed within the outer tube 24 is provided with a plurality of openings or perforations 32 which open into the annular space between the tubes.

Secured to the outer tube 24 in any suitable manner is a cultivator foot 34 having a curved lower end 35. The lower ends of the tubes 22 and 24 are correspondingly curved and follow the curved foot portion 35 when the cultivator plows a furrow in the soil.

On the tractor 10 a water container 36 and a cylinder of liquefied anhydrous ammonia 38 are mounted. A conduit 40 conducts water from the container 36 to the water inlet 26 and conduit 42 conducts the ammonia to the inner tube 22.

The flow of liquid anhydrous ammonia and water to the discharge orifice 29 is shown in Figure 5 where it is seen that the ammonia passes from the cylinder 38 through the conduit 24 into the inner tube 22. To control the pressure of the ammonia escaping from the cylinder, a valve 46 is provided in the conduit 42; a suitable gauge (not shown) is also provided to register the pressure at which the ammonia is released. The anhydrous ammonia released from the cylinder passes through the perforations 32 and may thence be discharged directly into the soil through discharge orifice 29.

Also, as anhydrous ammonia is released from the cylinder, water may simultaneously flow from the container 36, through the conduit 40 and water inlet 26 to the annular space between the outer and inner tubes blanketing the inner tube. When this occurs, a resultant solution of aqua ammonia or water in ammonia is formed within the annular space between the tubes and is discharged into the soil. Valve 48 on the conduit 40 controls the flow of water to the outer tube 24. For safety, a check valve 50 is mounted on the conduit 42.

By the above arrangement, a single apparatus is provided for discharging either liquid anhydrous ammonia or aqua ammonia into the soil. Further, with this apparatus, a continuous process for producing aqua ammonia is provided.

In deep soil applications of fixed nitrogen, from 6 to 10 inches, the apparatus may discharge liquid anhydrous ammonia directly into the soil. This application is desirable in fertilization for crops such as sugar cane and the like.

In shallow applications of fixed nitrogen, for field crops such as grass lands and rice, the anhydrous ammonia may be mixed with water as the streams of liquid ammonia and water are simultaneously directed toward the soil. The water in the outer tube blankets the ammonia flow from the inner tube and prevents it from escaping into the atmosphere.

Vaporization of liquid anhydrous ammonia is accompanied by a sharp drop in the surrounding temperature. Dissolution of ammonia in water entails a rise of temperature. Thus, in the apparatus described above, the temperature changes balance each other and prevent both the freezing of condensates on the applicator tube or mixing device and the objectionable accumulation of heat usually present in the production of aqua ammonia.

Since the solubility of ammonia in water increases with an increase in pressure and a decrease in temperature, the amount of fixed nitrogen in the described process for providing aqua ammonia may be greatly varied from 25% by weight to 81% by weight of solution by varying the releasing pressure of the anhydrous ammonia and/or the temperature of the water and/or by varying the ratio of the weights of the water and ammonia being discharged from the applicator. Since the percentage of ammonia by weight in a solution of aqua ammonia at standard conditions is 28%, it is thus possible to produce supersaturated solutions of aqua ammonia under the ambient conditions of the soil to which they are applied.

Therefore, it is possible to saturate the soil with a supersaturated solution of ammonia without danger of burning the sod. The degree of supersaturation must, of course, be limited to that which will not release more free ammonia than the soil will readily absorb.

Finally, the purpose of using water with liquid ammonia is to prevent the escape of free ammonia from the soil in shallow fertilization applications. With the apparatus of the instant invention, the ammonia and water may be mixed so that the maximum quantity of ammonia may be added to the soil with the amount of water being limited to that which is just sufficient to prevent the escape of free ammonia as the liquid ammonia is discharged into the soil and the advantages of fixed nitrogen fertilization obtained by the use of anhydrous ammonia are extended to fertilization operations in which the use of anhydrous ammonia in the conventional manner would seriously damage the vegetation, soil or crop, or in which the dryness of the soil would prevent direct application of anhydrous ammonia.

Since numerous modifications and changes will readily occur to those skilled in the art, it is not desired to limit the invention to the exact construction shown and described, and accordingly, suitable modifications and equivalents may be resorted to, which fall within the scope of the appended claims.

What is claimed as new is as follows:

1. A soil fertilizing apparatus adapted for attachment to a cultivator with a cultivator blade, comprising an ammonia tank, a water tank and an applicator adapted to be attached to the cultivator, said applicator including a pair of spaced substantially concentric tubes reaching into the soil enclosing between them an annular chamber, the outer one of the spaced tubes having a discharge opening at its lowest end but being closed at its upper end and joined to the inner one of the spaced tubes, which is closed at its lowermost and outermost end, and is provided with lateral openings forming a communication between said inner one of the spaced tubes and the annular chamber between the tubes, means for supporting said pair of tubes on the cultivator, means for connecting said inner tube with the ammonia tank, means for connecting the outer one of the tubes near its upper closed end with the water tank and fluid control means in each of said connection means for admitting and shutting off flow of fluids from the fluid tanks to the tubes of the applicator.

2. A soil fertilizing apparatus for supplying the soil with nitrogen by injecting alternatively ammonia in an anhydrous state or various mixtures of ammonia and water, said soil fertilizing apparatus being attachable to a cultivator provided with a curved cultivator blade penetrating into the soil during operation, comprising an ammonia tank, an inner tube connected with said ammonia tank by a fluid conducting connection, a water tank, an outer tube of a larger diameter than the inner tube surrounding the said inner tube and connected with the water tank by a water conducting connection, the inner and outer tubes enclosing between them an annular chamber, both tubes being shaped to conform themselves to the shape of the cultivator blade, the inner tube having its lowermost end closed and the outer tube having its uppermost end closed and being joined to the inner tube at the closed end, while the lowermost end has a discharge opening, the inner tube being further provided with lateral openings to discharge ammonia admitted into the inner tube into the annular chamber, the ammonia admitted to the inner tube being thus discharged into the soil through the annular chamber and the discharge opening of the outer tube, means for supporting the outer tube on the cultivator blade, and means in each of said conducting connections for admitting or shutting off the connection between the ammonia and the water tank and the inner and the outer tubes respectively.

3. A soil fertilizing apparatus for supplying the soil with fertilizing nitrogen by injecting ammonia either in an anhydrous state or in the form of various mixtures between ammonia and water, said apparatus being attached to a cultivator provided with a cultivator blade penetrating into the soil during operation, comprising a pair of substantially concentric inner and outer spaced tubes, enclosing between them an annular chamber, the inner tube being provided with a closed outer end and being further provided with a plurality of lateral perforations in its side wall, opening into the annular chamber between the tubes, a water container, fluid conducting means connected with said water container for supplying water to the said outer tube, an ammonia container, means for supplying ammonia from the container to said inner tube, fluid control means for selectively admitting, regulating, and shutting off the water admitted to said outer tube, means for attaching said outer tube to the cultivator blade of the cultivator, and means for supporting said inner tube by joining it to the outer tube.

4. A soil fertilizing apparatus for supplying the soil with ammonia either in an anhydrous state or in mixtures of varying proportions of water and ammonia, said apparatus being attached to a cultivator with a cultivator blade, comprising an outer tube, a water container and a conduit leading from said water container to said outer tube, an inner tube surrounded by said outer tube so that a substantially annular space is formed between the inner and the outer tube, an ammonia container and a conduit leading from the same to the inner tube, the latter being provided with a closed end and with lateral openings in its side wall for the passage of the ammonia therethrough into the annular space between the inner and outer tubes, the outer tube being provided at its end with a discharge opening, the closed end of the inner tube being located inside the outer tube but in close proximity to the discharge opening of the outer tube, so that an annular discharge passage for the ammonia is provided, means in the conduit leading from the water container to the outer tube for regulating the admission of water to the outer tube, and means for attaching said outer tube to the cultivator blade in a position in which the discharge end of the outer tube is adjacent to the end of the cultivator blade.

No references cited.